United States Patent [19]

Jardin

[11] 4,081,926
[45] Apr. 4, 1978

[54] SUNROOF

[75] Inventor: Hans Jardin, Inning, Germany

[73] Assignee: Webasto-Werk W. Baier GmbH & Co., Germany

[21] Appl. No.: 783,647

[22] Filed: Apr. 1, 1977

[30] Foreign Application Priority Data

Apr. 29, 1976 Germany .............................. 2618788

[51] Int. Cl.² ............................................ E05F 11/38
[52] U.S. Cl. ........................................ 49/210; 49/223;
49/352; 49/360; 296/137 F; 296/137 G
[58] Field of Search ................. 49/210, 325, 352, 360,
49/221-223; 296/137 E, 137 F, 137 G, 137 B

[56] References Cited

U.S. PATENT DOCUMENTS

| 2,973,991 | 3/1961 | Werner | 49/210 X |
| 3,863,979 | 2/1975 | Bienert | 49/360 X |

FOREIGN PATENT DOCUMENTS 233,605   4/1961   Australia .................................. 49/352

Primary Examiner—Philip C. Kannan
Attorney, Agent, or Firm—Craig & Antonelli

[57] ABSTRACT

Sunroof apparatus is provided for a passenger motor vehicle, which apparatus includes a rigid movable cover member for closing a sunroof opening. In order to minimize the space taken by the drive mechanism for moving the cover member to open positions from the closed position thereof, a single incompressible drive cable is provided which has one end attached to a guide element at one lateral side of the cover member and the other opposite end attached to a guide element at the opposite lateral side of the cover member. A cable driving mechanism such as an electric motor is disposed intermediate the ends of the cable for drivingly moving the same in respective opposite directions. The cable is guided and attached to the guide elements so that, upon movement of the cable in one direction, the guide element at one side of the vehicle is pulled in a first axial direction of the vehicle and the guide element at the opposite lateral side of the vehicle is pulled in the same axial direction. In preferred embodiments, the guide elements are constructed so as to accommodate sliding, tilting, and combined sliding and tilting movement of the cover member with respect to the adjacent roof panel structure in response to movement of the guide elements.

10 Claims, 4 Drawing Figures

SUNROOF

BACKGROUND AND SUMMARY OF THE INVENTION

The invention relates to a sunroof or the like with an opening surrounded by a roof frame, said opening being closable by a slidable and/or tiltable rigid cover, said cover being guided swivelably on both sides in the vicinity of its rear edge and possibly also slidable along the roof frame by means of guide elements, said guide elements being engaged by the ends of an incompressible cable connected to a drive means.

Sliding covers of motor vehicle sunroofs are generally slid by means of two incompressible cables, said cables each having one end attached to the rear guide elements of the sliding cover and running parallel to one another in the vicinity of the forward edge of the roof opening, whereby the drive means, for example a pinion driven by a hand crank or an electric motor, is provided at the level of the center of the forward edge of the roof opening between the parallel segments of the cable, said pinion pulling or squeezing both cables when actuated, whereby the rear end of the cover is pushed by the guide elements either beneath the fixed rearward part of the roof or pulled forward to close it, or, in a sliding and tilting roof, swiveled outward into a tilted position past the closed position. The exertion of the sliding forces on both sides of the sliding cover minimizes the danger or the cover tilting during sliding. A less advantageous feature of this design, however, is the fact that the required overlap of the two cables in the vicinity of the forward edge of the roof opening requires a relatively large amount of space for cable guidance and considerable lengths of cable and corresponding lengths for cable guide tubes are required. An electrial drive is relatively complicated in design, since a hollow shaft motor, extremely suitable by virtue of its design for driving a cable and requiring a small amount of space, requires an intermediate drive to drive two cables, as disclosed by German Offenlegungsschrift 18 01 436.

It is known from German Offenlegungsschrift 17 84 826 that a sliding cover can be slid by means of a single cable, said cable engaging the cover at its lengthwise central plane. However, the danger of tilting and resultant jamming of the cover during sliding is relatively great in this design, even if one cable end is not engaged directly with the cover but a carrier bridge, said brige being guided in lateral tracks mounted in the roof frame and connected by a swiveling mechanism with the rear end of the cover. In addition, a carrier bridge of this kind makes the design more expensive and reduces the clear opening in the roof in the case of a sliding cover whose near edge is also tiltable outward out of the plane of the roof. Moreover, when the cable is driven by a manually operated crank mechanism, a relatively long cable is required, since this cable must first be guided sufficiently rearward that the cover can be fully retracted, then guided laterally, and finally brought forward to the center of the front edge of the roof opening, since the hand crank must be mounted at this point.

An object of the invention is to provide a sunroof in which reliable and operationally safe operation of the cover is achieved by means of a single cable of the shortest length possible.

This object is achieved according to the invention by disposing the cable in such manner that it pulls on one guide element and pushes the other guide element in the same direction when the drive means is actuated.

In the design proposed according to the invention, no overlapping of the cables is required, thus ensuring the minimum possible space requirements an the minimum possible cable length. Nevertheless, the fact that the cable engages both sides of the cover ensures reliable and jam-free guidance. The use of a single cable makes it possible to drive the cover electrically by means of a simple hollow-shaft motor without additional drive stages.

To adjust the cover, especially when installing the latter, a device for adjusting one end relative to the guide element is provided, between at least one end of the cable and the corresponding guide element. This device also allows subsequent adjustment of the cover when the cable has lengthened somewhat following a long period of operation. The adjusting device in preferred emnbodiments includes a threaded rod which constitutes an extension of the cable end, said rod extending through a bore in the guide element and being lockable on both sides of the guide element against the latter by means of lock nuts.

An embodiment of the invention is described below with reference to the drawings, in conjunction with a sliding and tilting roof in which the cover can be pushed out of the closed position, both rearward beneath the fixed part of the roof and forward, with its rear edge tilted above the roof plane. However, the invention can be used for roofs which only slide, in which the cover can only be slid backward out of the closed position, and for tiltng roofs, in which the cover can only be tilted upward out of the closed position.

These and further objects, features and advantages of the present invention will be come more obvious from the following description when taken in connection with the accompanying drawings which show, for purposes of illustration only, a single embodiment in accordance with the present invention.

DETAILED DESCRIPTION OF THE DRAWINGS

Figure 1:
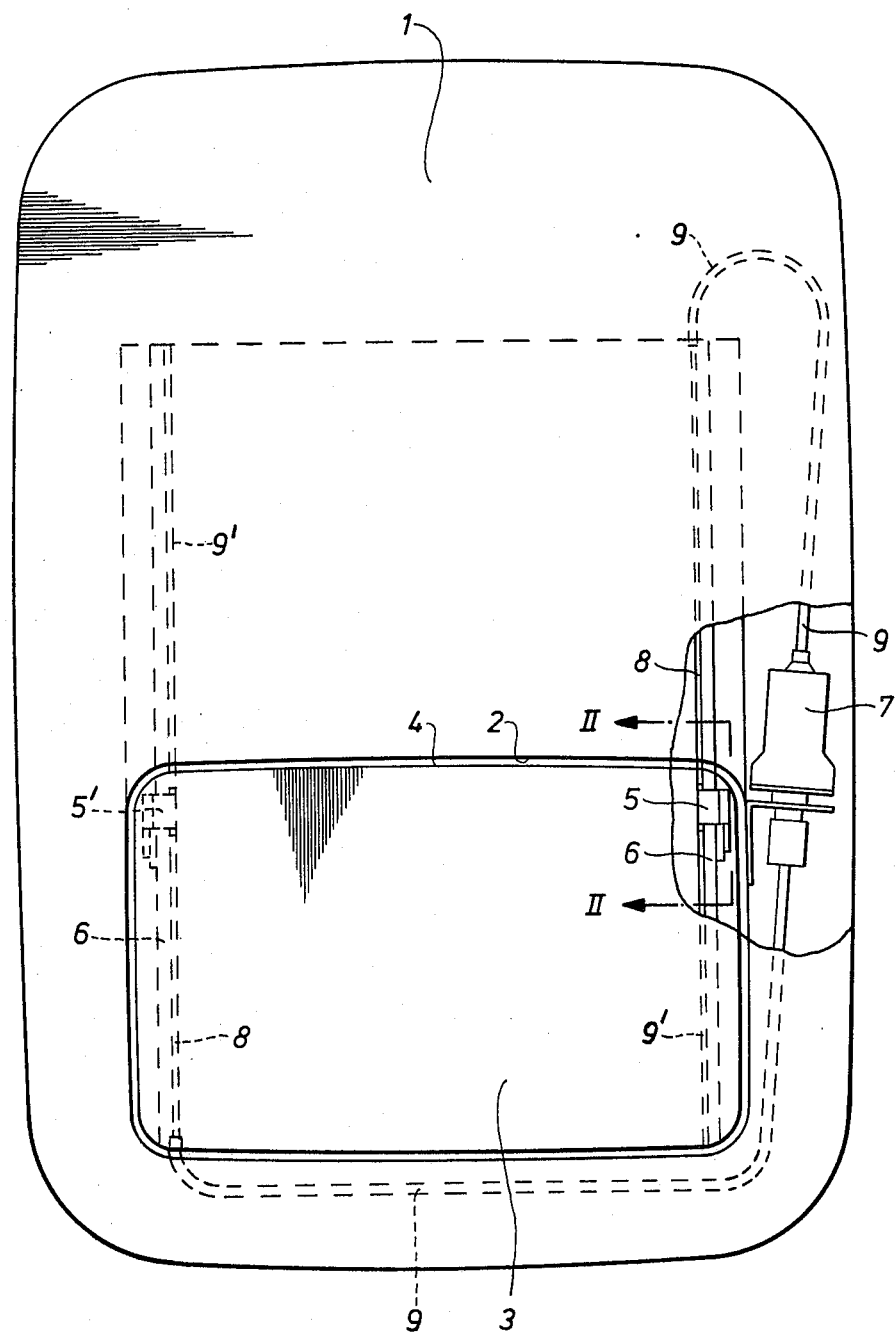
FIG. 1 is a top view of a sunroof, with a portion of the outer roof skin cut away, showing a preferred embodiment of the present invention.

Reference is made first to FIG. 1, where 1 represents the vehicle roof, provided with a rectangular opening 2, closable by a right cover 3. Cover 3, in a manner to be described hereinbelow, can either be lowered with its rear edge downward from the closed position shown in FIG. 1 and then slid beneath the rearward part of the roof, or can be tilted above the roof plane with its rearward end upward. To accomplish these movements, cover 3 is swivelable on both sides near its forward end by means of sliding shoes (not shown) about an axis running transversely to the lengthwise axis of the vehicle. Near its rear edge 4, cover 3 is articulated on both sides with guide elements 5, 5' represented schematically in FIG. 1; said elements being guided in lateral tracks 6 provided in roof frame 1a.

To move cover 3, an electric motor 7 in the form of a "hollow-shaft" motor, is provided in the embodiment. The design of such a hollow-shaft motor is represented schematically in German Offenlegungsschrift 17 84 826 cited hereinabove. An incompressible cable 8 extends through the hollow drive shaft of motor 7, said cable being guided in a guide tube 9 and/or in the vicinity of tracks 6 in a cable guide 9' connected with the latter. The cable 8 further has its ends connected at one end to guide element 5 and at the other end to guide element 5'. When motor 7 is energized to move the sliding cover rearward from the closed position, guide element 5 is pulled backward by cable 8, i.e. toward the top in FIG. 1, while guide element 5' is pushed by cable 8 in the same direction. On the other hand, if sliding cover 3 is to be transported from a retracted position back to the closed position, or from the closed position into a tilted position, the direction of rotation of motor 7 is reversed by a switch (not shown), so that guide element 5 is pushed by cable 8 and guide element 5' is pulled.

Figure 4:
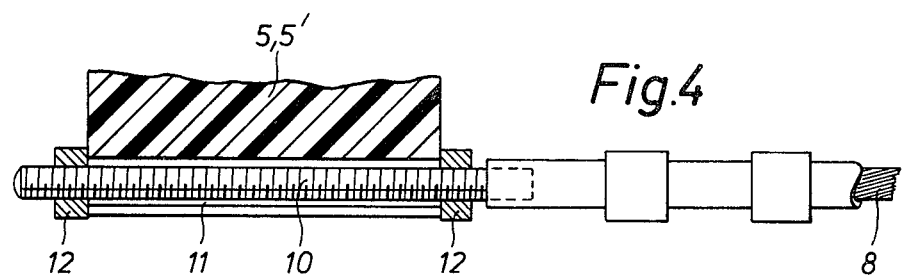
FIG. 4 is a view which shows the adjusting device at one end of the cable on an enlarged scale.

In order to be able to adjust the cover 3 correctly, i.e. with its lengthwise axis exactly perpendicular to the lengthwise central axis of he vehicle, an adjusting device is provided between at least one end of cable 8 and the corresponding guide element 5 or 5', said adjusting device being shown separately in FIG. 4. This adjusting device in the embodiment shown consists of a threaded rod 10 constituting an extension of th cable end, said rod extending through a bore 11 in guide element 5 or 5' and being adjusted in its position relative to guide element 5 and/or 5' by means of lock nuts 12. This adjustment is required following installation of cover 3, but can also be carried out later following possible lengthening of incompressible cable 8.

Figure 3:
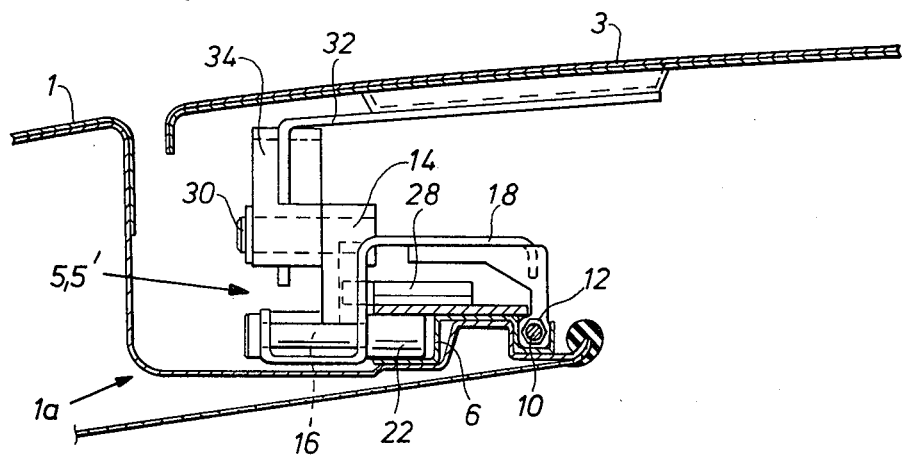
FIG. 3 is a sectional view along line III—III in FIG. 2.
Figure 2:
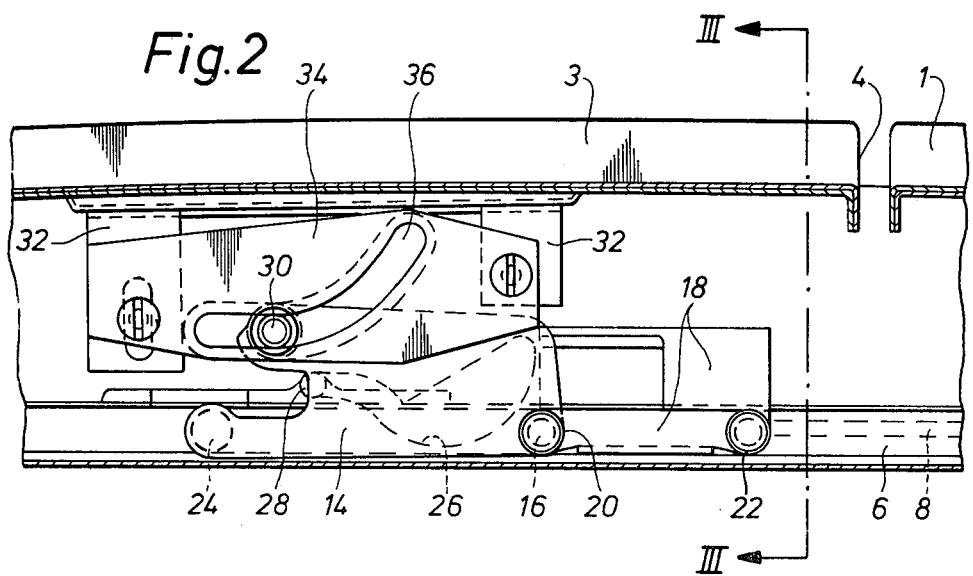
FIG. 2 is a sectional view along line II—II in FIG. 1.

FIGS. 2 and 3 show the construction of one of the guide elements and its connection to cover 3. The guide element 5, 5' is provided with a plate-shaped body portion 14, said body portion 14 being mounted to a bridge 18 so that it swivels about a pin 16, said bridge 18 in turn carrying a primary sliding shoe 20 and a secondary sliding shoe 22, said shoes being guided in track 6. One end of incompressible cable 8 is also attached to and movable with bridge 18. Only threaded rod 10 with lock nuts 12 is visible in FIG. 3. Plate portion 14 is provided with an auxiliary sliding shoe 24 in the vicinity of the end which faces away from pivot pin 16, said shoe 24 likewise being guided in track 6, but capable of extending out from sliding track 6 through a cutout to accommodate tilting of the cover. Plate 14 is also provided with a cutout 26, with which a pin 28 mounted on track 6 can engage. A mounting plate 34 is mounted on cover 3 by means of brackets 32, said plate being provided with an arcuate link slot 36, engaged by a pin 30 mounted on plate 14. If cover 3 is to be swiveled from the closed position shown in FIG. 2 with its rearward end 4 tilted upward, in other words out of the plane of roof 1, bridge 18 is moved leftward in FIG. 2 by means of the incompressible cable. Fixed pin 28 then engages recess 26 in plate 14. During the first stage of the movement, plate 14 is displaced only linearly until pin 30 strikes the left end of link slot 36. As bridge 18 continues moving leftward, plate 14 is swiveled upward about pin 16 as a result of the cooperation between pin 28 and slot 26, tilting cover 3. If cover 3 is to be returned to is closed position, bridge 18 is pushed rightward in FIG. 2, whereupon the above sequence of movements taks place in reverse order. If cover 3 is to be pushed rearward beneath the fixed part of the roof from the closed position, bridge 18 is pushed rightward in FIG. 2 by means of the incompressible cable, whereby the rear edge 4 of cover 3 is first lowered by pin 30 as a result of is cooperation with link slot 36 until pin 30 strikes the righthand end of link slot 36, whereupon cover 3 is carried rightward as bridge 18 continues moving.

The invention is not limited to the example shown. Thus, a hand crank can be provided instead of driving cable 8 by electric motor 7. Preferred embodiments of the invention can also be applied to sunroofs whose covers are only tiltable or only slidable. Only an appropriate modification of guide elements 5, 5' would then be necessary.

While I have shown and described various embodiments in accordance with the present invention, it is understood that the same is not limited thereto but is susceptible of numerous changes and modifications as known to those skilled in the art and I therefore do not wish to be limited to the details shown and described herein but intend to cover all such changes and modification as are encompassed by the scope of the apppended claims.

I claim:

1. Sunroof or the like apparatus of the type having an opening surrounded by frame structure, said apparatus comprising:

a rigid cover member, first and second guide elements disposed at respective opposite lateral sides of said cover member, said guide elements being configured to guidably support said cover member at said frame structure during movement of said cover member from a position closing said opening to respective open positions.

incompressible cable means having a first end connected and movable with said first guide element and a second opposite end connected to and movable with said second guide element, and drive means for drivingly moving said cable means, wherein said cable means is disposed so that when said drive means is actuated, said cable means pulls said first guide element in a direction and pushes said second guide element in the same direction.

2. Apparatus according to claim 1, wherein said guide elements are configured to swivelably guide said cover member at both lateral sides thereof.

3. Apparatus according to claim 1, wherein the drive means is an electric hollow-shaft motor, through whose hollow drive shaft the incompressible cable means extends.

4. Apparatus according to claim 1, wherein said cover member and slidable cover for a passenger vehicle sunroof opening.

5. Apparatus according to claim 1, wherein said cable means is a single cable member, and wherein said driving means drivingly engages said cable member at a position intermediate the ends thereof.

6. Apparatus according to claim 5, wherein the drive means is an electric hollow-shaft motor, through whose hollow drive shaft the incompressible cable means extends, and wherein said motor is disposed at one lateral side of said cover member.

7. Apparatus according to claim 5, wherein said guide elements are configured to effect pivotal tilting movement of said cover member about a transverse axis upon a predetermined movement of said cable member and guide elements.

8. Apparatus according to claim 1, further comprising an adjusting device provided between at least one end of said cable means and the corresponding guide element for adjusting this end relative to the guide element.

9. Apparatus according to claim 8, wherein the adjusting device is provided with a threaded rod constituting an extension of the cable end, said rod extending through a bore in said guide element and being provided on both sides of the guide element with lock nuts by means of which the threaded rod can be locked to the guide element in respective positions thereof.

10. Apparatus according to claim 8, wherein said guide elements are configured to effect predetermined sliding and pivotal movements of said cover member in response to predetermined movement of said cable member and guide elements.

* * * * *